US012715349B2

(12) United States Patent
Soraghan

(10) Patent No.: US 12,715,349 B2
(45) Date of Patent: Aug. 25, 2026

(54) HEAD REST COVER

(71) Applicant: Laura Soraghan, Salisbury, MA (US)

(72) Inventor: Laura Soraghan, Salisbury, MA (US)

( * ) Notice: Subject to any disclaimer, the term of this patent is extended or adjusted under 35 U.S.C. 154(b) by 224 days.

(21) Appl. No.: 18/298,670

(22) Filed: Apr. 11, 2023

(65) Prior Publication Data

US 2024/0343173 A1 Oct. 17, 2024

(51) Int. Cl.
*B60N 2/60* (2006.01)
*A47C 7/38* (2006.01)

(52) U.S. Cl.
CPC ............ *B60N 2/6063* (2013.01); *A47C 7/386* (2013.01)

(58) Field of Classification Search
CPC .. B60N 2002/899; B60N 2/60; B60N 2/6063; A47C 7/386
See application file for complete search history.

(56) References Cited

U.S. PATENT DOCUMENTS 5,618,082 A 4/1997 Jachmich
5,964,504 A * 10/1999 Hogan .................. A47C 7/383 297/400
6,948,771 B1 9/2005 Salandy
7,472,953 B1 * 1/2009 Lalji ...................... A47C 7/386 297/229
D603,201 S 11/2009 Corle
7,770,976 B2 8/2010 Lee
7,997,646 B2 8/2011 Resendez
9,610,877 B2 * 4/2017 Umlauf ................ B60N 2/6018
9,968,198 B2 * 5/2018 Hauer .................. A47G 9/1081
10,638,845 B2 5/2020 Pierce
10,822,092 B2 * 11/2020 Erb .................... B64D 11/0647
10,836,284 B1 * 11/2020 Mizera ................. A47G 11/004
11,528,996 B2 * 12/2022 Pierce .................... B60N 3/002
2002/0074838 A1 6/2002 Whiting
2002/0179212 A1 * 12/2002 Willard .................. A47C 7/386 150/158
2004/0124685 A1 * 7/2004 Buch ...................... B60N 2/882 297/393
2004/0182485 A1 9/2004 Gomes
2006/0103195 A1 5/2006 Stanley
2007/0090669 A1 4/2007 Aharoni
2007/0161490 A1 * 7/2007 Srivastava ........... A47G 9/0253 493/464
2008/0093901 A1 4/2008 Hodge
2009/0039689 A1 * 2/2009 Smith .................. B60N 2/6063 297/220
2010/0045085 A1 2/2010 Jeffrey
2014/0028063 A1 1/2014 Firestone
2019/0016244 A1 * 1/2019 Umlauf ................ B60N 2/6018

FOREIGN PATENT DOCUMENTS

CN 203580711 U 5/2014
DE 102009035081 A1 2/2011

* cited by examiner

Primary Examiner — Philip F Gabler
(74) *Attorney, Agent, or Firm* — Lambert Shortell & Connaughton; David J. Connaughton, Jr.; Justin P. Tinger

(57) ABSTRACT

A head rest cover for providing a low friction surface on a head rest of a seat is provided. Friction alopecia, or hair loss caused by friction against hair, can be a problem at the rear of the head for those who spend time leaning their head against a headrest of a seat, such as a vehicle seat while driving, or any other seat. The present disclosure prevents friction alopecia by providing a smooth silk surface on which to rest one's head while seated which prevents the friction that leads to hair loss.

16 Claims, 4 Drawing Sheets

HEAD REST COVER

BACKGROUND OF THE INVENTION

The present disclosure relates generally to head rest covers. More particularly the present disclosure relates to a device which may removably cover a head rest and have a smooth fabric which prevents damage to the hair and scalp, including preventing hair loss by extended rubbing of the hair and head against the head rest.

Chairs and seats, particularly vehicle seats, typically include a head rest to provide a comfortable area to lean one's head and to encourage proper posture while driving. However, the surface of these head rests are often formed of leather, imitation leather, or a durable and high friction fabric. However, friction caused by rubbing of hair against a surface over time can lead to hair loss (alopecia). This is a particular problem for aging people already experiencing thinning hair and hair loss which make hair more susceptible to frictional alopecia. Extended driving with proper posture and resting the head against a head rest thus can cause hair loss on the back of the head.

Therefore, what is needed is a device which can be attached to a headrest such as a vehicle headrest which can reduce friction and prevent hair loss from extended use of the head rest.

SUMMARY OF THE INVENTION

The subject matter of this application may involve, in some cases, interrelated products, alternative solutions to a particular problem, and/or a plurality of different uses of a single system or article.

In one aspect, a headrest cover is provided. The headrest cover comprises a silk strip which is positioned covering a front of the head rest, and an elastic strip having a first end attached to a first widthwise edge of the silk strip, and having a second end attached to a second widthwise edge of the silk strip. As such, this forms the headrest cover as a loop.

In another aspect, a seat having a headrest cover is provided. The seat has a base, a back, and a headrest on a top of the back. A headrest cover is attached around an outer perimeter of the headrest. The headrest cover comprises a silk strip which is positioned covering a front of the head rest, and an elastic strip having a first end attached to a first widthwise edge of the silk strip, and having a second end attached to a second widthwise edge of the silk strip. As such, this forms the headrest cover as a loop. The elastic strip positioned in a partially stretched position around sides and a rear of the head rest, the elastic strip applying a force to the head rest by being in the partially stretched position.

In another aspect, a method of constructing a hair-protective headrest cover is provided. The method involves folding opposite widthwise edges of a first and second silk strips inward and baste stitching the folded portion inward from the folded edges. Then, the first and second silk strips are placed together and a seam is straight stitched along a top and bottom of edges of the strips, joining them together. A first edge of an elastic strip is fitted into a pocket on a first widthwise edge of the connected first and second strips, and then connected to the silk strips using a stitch in the ditch. Similarly, a second edge of an elastic strip is fitted into a pocket on a second widthwise edge of the connected first and second strips, and then connected to the silk strips using a stitch in the ditch.

DETAILED DESCRIPTION OF THE INVENTION

Figures 1, 2:
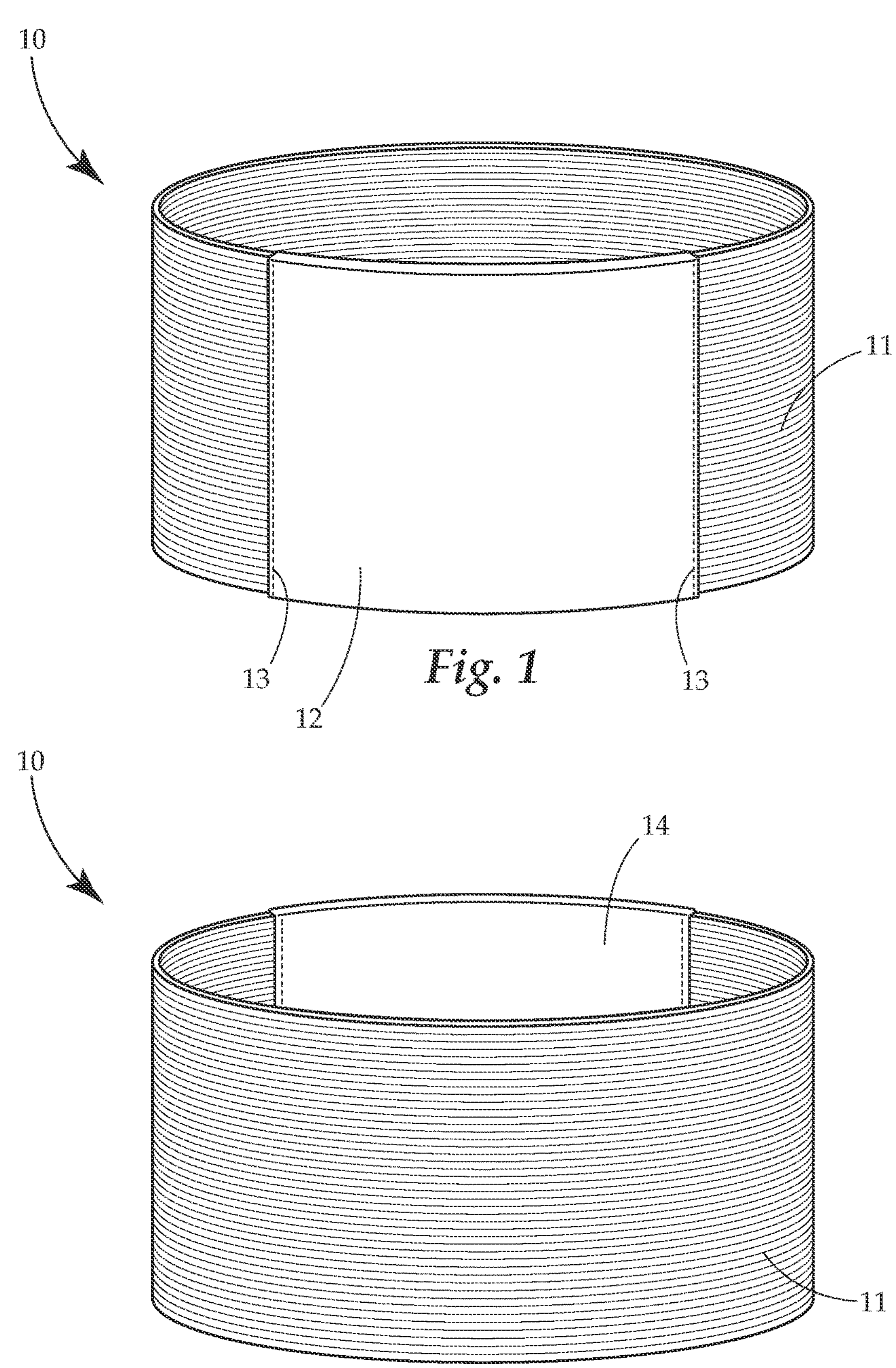
FIG. 1 provides a front perspective view of an embodiment of the present disclosure.
FIG. 2 provides a rear perspective view of an embodiment of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a headrest cover which can be attached to a headrest. The headrest cover provides a low friction surface on which a user may rest their head which limits or eliminates hair loss due to friction alopecia. Typically, the low friction surface is formed of a material such as natural or artificial silk which is particularly effective for providing low friction against hair. The headrest cover further comprises an elastic material connected to the low friction surface which is able to stretch around all or a part of the headrest. Typically, the elastic material is a stretchable fabric, though any stretchable material may be used. In some embodiments, the headrest cover may be reversible such that the low friction material has a front and a back which may have a different color or pattern for variable style options.

The low friction surface may be formed of a low friction fabric or membrane such as silk, artificial silk, satin, smooth plastic sheeting, and the like. As discussed herein, the term "silk" or "silk strip" is used to generally refer to the material forming the low friction surface but may apply to materials other than silk. The elastic material, also referred to as an "elastic strip" may be formed of any material which can stretch around and/or over a headrest so as to hold the headrest cover in place on the headrest. Typically, the elastic strip is formed of a stretchable fabric. In a particular embodiment the elastic strip may be formed of a stretchable polyester and rubber fabric. The elastic strip is formed of a different material than the low friction (silk) strip. In some cases, the low friction strip may be stretchable, and in such an embodiment, the elastic strip could be omitted. As discussed in embodiments having both an elastic strip and low friction material, it is to be understood that they refer to different materials.

As discussed herein, the headrest is a pad or support attached to or formed into a top of a seat such as a chair, vehicle seat, any other area where a person may be seated, and the like. The headrest extends from a top of the seat back and is an area intended for a user to rest or lean their heads.

The headrest cover may be formed in a number of different manners as can be understood by one skilled in the art. In a particular embodiment, an embodiment of the headrest cover may be formed as follows. Widthwise edges of a first silk strip and second silk strip may be folded inward and then baste stitched to form a double layered folded portion at the widthwise edges of the two silk strips. The two silk strips are then placed together with the folded portions facing away from each other (i.e. the "finished" sides are facing each other, and then a straight seam is stitched along top and bottom edges to form a reversible low friction surface. The assembly can then be flipped inside out for the operational configuration having the "clean" sides facing outward. In some embodiments, a cotton layer may be positioned between the first silk strip and second silk strip. This may provide more body to the combined silk layers, and help it retain its shape, and generally provide a more resilient and long lasting headrest cover. A first edge of an elastic strip, which is, in most embodiments between 2-5 times longer than the silk strip, is fitted into a pocket defined by the widthwise edges of the first and second silk strip. In one embodiment, the elastic strip may be approximately three times as long as the silk strip. The edge of the elastic strip is then connected to at least one of the two silk strips by a stich-in-the-ditch. A second opposite edge of the elastic strip is then fitted into a second pocket on the opposite side of the two silk strips, and again held to at least one by a stich-in-the-ditch. The forms the headrest cover as a loop of both the silk low friction surface and the elastic strip.

Figure 3:
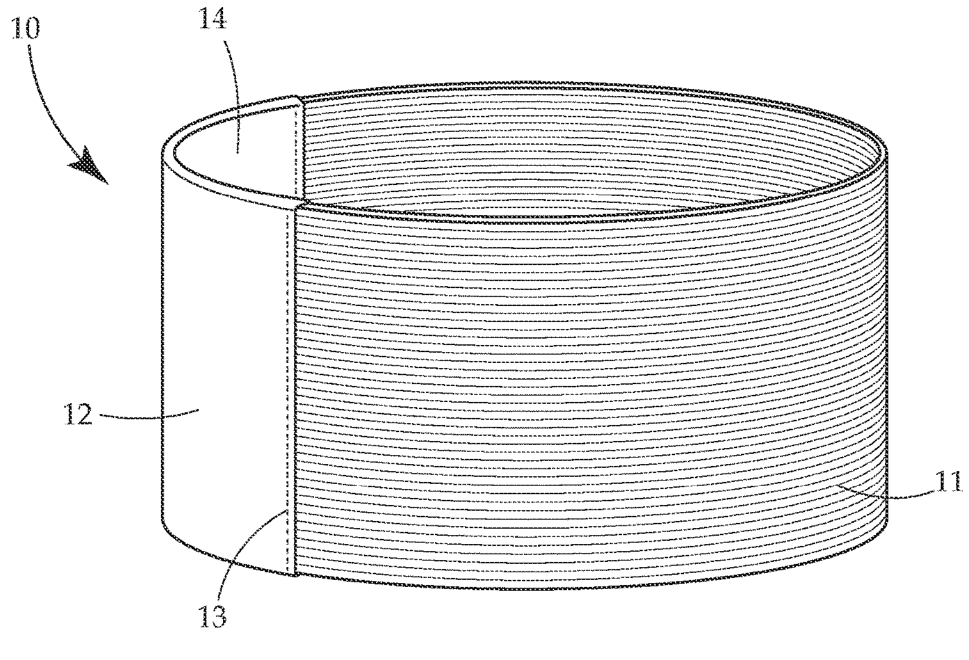
FIG. 3 provides a side view of another embodiment of the present disclosure.

Turning now to FIGS. 1, 2, and 3, perspective and side views of an embodiment of the headrest cover of the present disclosure are shown. Headrest cover 10 is formed of a silk strip 12 and an elastic strip 11 connected together to form a loop. The ends of the elastic strip 11 are connected to opposing widthwise ends of the silk strip. The silk strip 12 provides the low friction surface which covers a headrest in an area where a user's head contacts the headrest. In this embodiment, the silk strip 12 has two separate silk layers, a first silk strip on the front and a second silk strip on the rear 14. In some embodiments, the front and rear 14 silk strip layers may be the same fabric type. In other embodiments, the front and rear 14 silk strip layers may be different and/or may have a different color or pattern. Stitching is shown on the opposite widthwise edges of the silk strip 12 at both front and rear 14. In one embodiment, the stitching 13 may be used to join the elastic strip 11 to the silk strip 12. In another embodiment, stitching 13 may be visible which holds a folded over portion of the first and second silk strips in place. For example in an embodiment as discussed above in the exemplary method of construction one embodiment of the device. In one embodiment, the elastic layer is stretchable while the silk layer is not. As such, when installing the headrest cover 10 on a headrest, the elastic layer 11 is stretched around the headrest and then released to hold the headrest cover in place.

Figure 4:
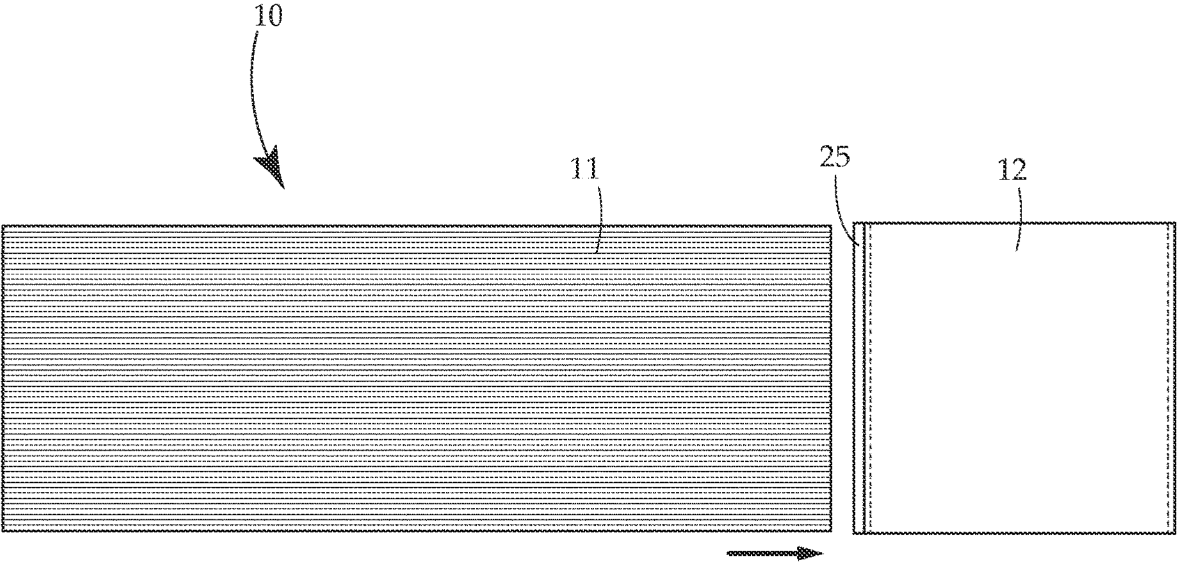
FIG. 4 provides a view of an embodiment of an assembly of still another embodiment of the present disclosure.

FIG. 4 shows a view of an embodiment of constructing the headrest cover. The silk strip 12 is formed of two layers which are connected at the top and bottom edges. This forms a pocket 25 between the two layers. An end of elastic strip 11 is urged into the pocket 25 as shown by arrow. The elastic strip may then be connected to one or both of the two silk strip layers. In a particular embodiment, the elastic strip may be connected to the silk strip 12 via a stitch in the ditch to one or both layers.

Figure 5:
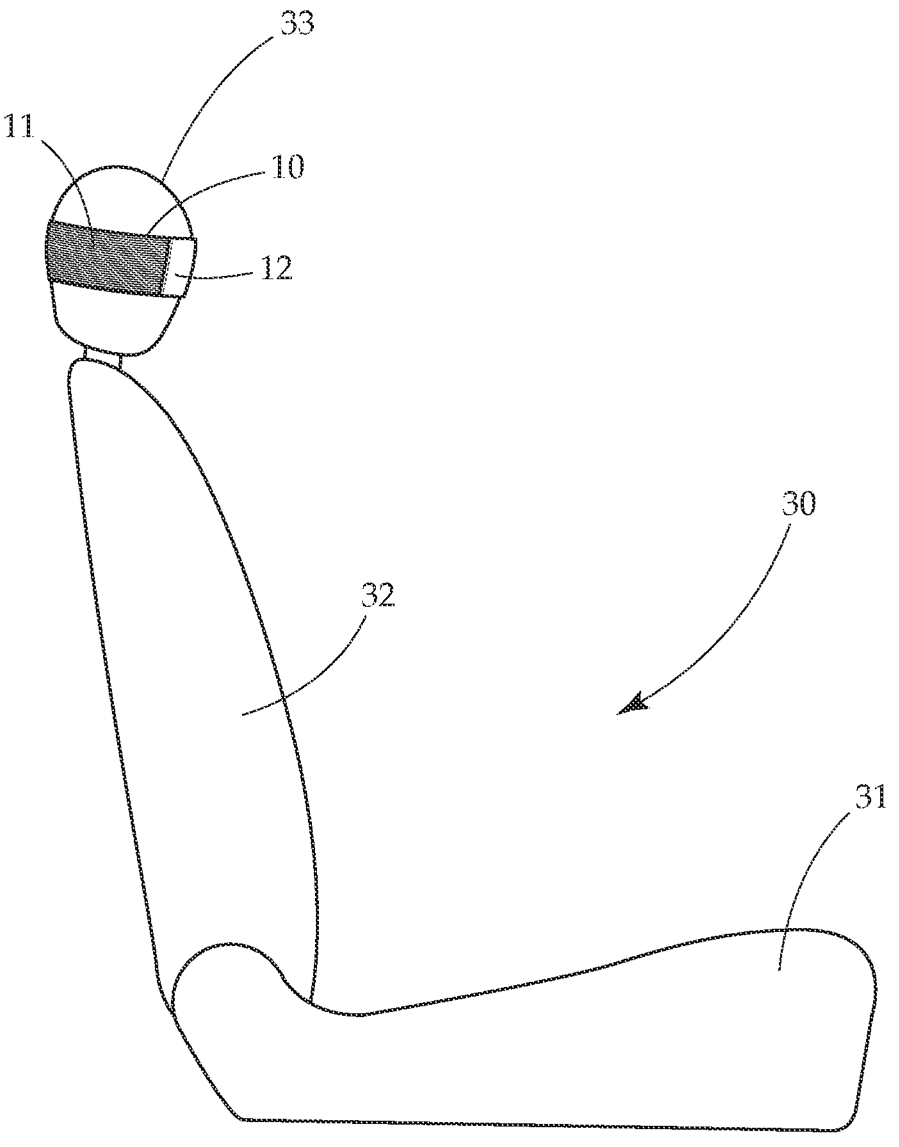
FIG. 5 provides a side view of an embodiment of the present disclosure installed on a head rest.

FIG. 5 provides a view of an embodiment of the headrest cover connected to a headrest. This figure shows a seat, which in this embodiment is a vehicle seat 30 having a seat base 31 and a seat back 32. On a top of the seat back 32 is a headrest 33 on which a user may lean or support their head. The headrest cover 10 is attached to the headrest 33 by having the elastic strip 11 in a partially stretched position such that it applies a force against the headrest 33 to cause friction to hold the headrest cover 10 in place. The silk strip 12, which is non-stretchable in this embodiment (but may be stretchable in others), is oriented over a front of the headrest 33 where a user's head will contact the headrest 33. Depending on embodiment, the thickness of the headrest cover 10 may vary to cover some, most, nearly all or all of the front of the headrest 33 by the silk strip 12. As can be seen, the headrest cover 10 is oriented horizontally across the headrest 33 and crosses widthwise across the headrest 33 attached around an outer perimeter of the headrest. The headrest cover 10 as shown, may be removed from the headrest 33 by stretching the elastic slightly and lifting it over a top of the headrest cover. Removing the headrest cover 10 may allow for cleaning of both cover and headrest, as well as replacing the headrest cover with another differently styled or newer one.

Figure 6:
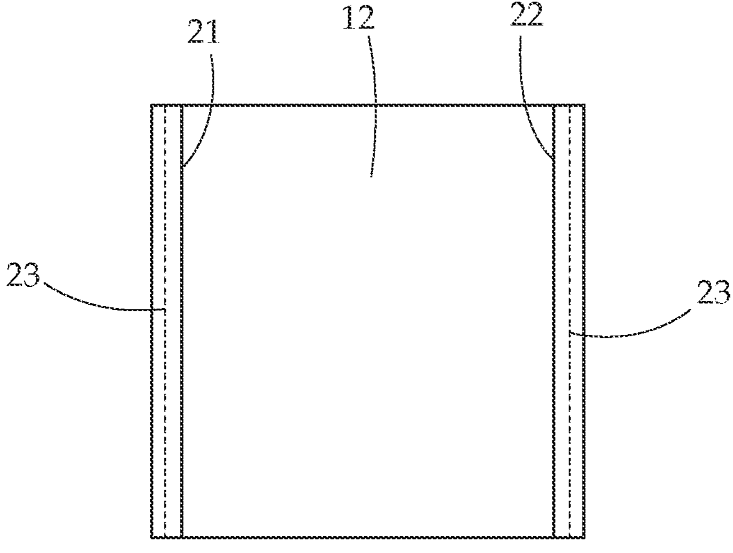
FIG. 6 provides a detail view of an embodiment of an assembly of yet still another embodiment of the present disclosure.
Figure 7:
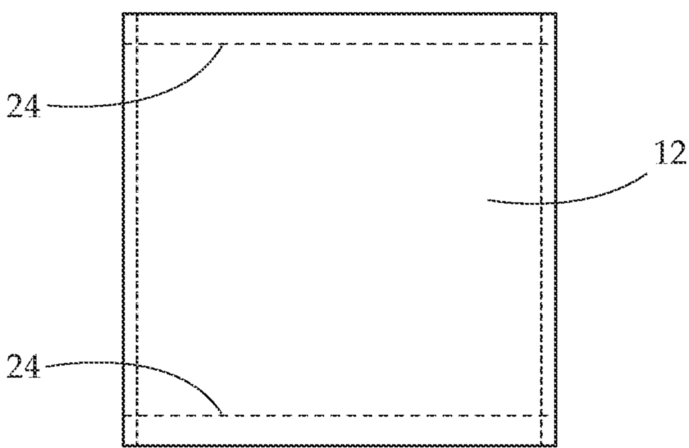
FIG. 7 provides a provides a detail view of an embodiment of an assembly of another embodiment of the present disclosure.

FIGS. 6 and 7 show views of the silk strip in various stages of an embodiment of the assembly of the headrest cover. FIG. 6 shows a rear of a first silk strip 12. Two opposite widthwise edges 21, 22 are folded inward to make a two layered area. Each folded edge 21, 22, is then held in place with a baste stitch 23. A similar folding and stitching can be done with a second silk strip (not shown). The folding provides a clean edge to the silk strip and also provides a reinforcing and sturdy edge reinforcement to help keep the headrest cover properly shaped during connection and use. The baste stitching similarly provides a supporting structure to the silk strip to prevent it from being flimsy, wrinkling, folding over itself, and the like. FIG. 7 in turn shows a second step of the assembly after the construction of FIG. 6, which involves the first silk strip 12 placed on top of a similarly folded and stitched second silk strip (not shown). The baste stich 23 can be seen on the left and right widthwise sides. Once positioned, the two silk layers are then joined together by straight stitching a seam across the top and bottom edges of the two strips. This leaves a pocket on each widthwise edge which, as shown in the embodiment of FIG. 4, can receive an end of the elastic strip on both sides, which can then be connected to the silk strip on both sides, forming a loop of the headrest cover.

It should be understood that the vehicle seat may be in any vehicle such as a car, truck, train, airplane, construction vehicle, and the like. Accordingly, it should be understood that the present disclosure further contemplates, includes, and covers any of these vehicles, and any other vehicles, having a seat 30 with the headrest cover 10 of the present disclosure therein.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A seat, comprising:

a base;

a back; and a head rest connected to a top of the back in a vertical direction;

a head rest cover horizontally attached around an outer perimeter of the head rest, the head rest cover comprising:

a silk strip positioned covering a front of the head rest; and an elastic strip having a first end attached to a first widthwise edge of the silk strip, and having a second end attached to a second widthwise edge of the silk strip and thereby forming the head rest cover as a loop, the elastic strip positioned in a partially stretched position around sides and a rear of the head rest, the elastic strip applying a force to the head rest by being in the partially stretched position, the force being a sole attached means of the head rest cover to the head rest;

wherein, the elastic strip is significantly longer than the silk strip in a horizontal direction in the partially stretched position;

wherein, the elastic strip is a sole structure attaching the head rest cover to the head rest;

wherein, a width of the elastic strip equals a width of the silk strip;

wherein, the elastic strip covers and contacts the sides and an entirety of the rear of the head rest;

a second silk strip attached to a rear of the silk strip and attached to the elastic strip;

a cotton layer between the silk strip and the second silk strip;

wherein the first widthwise edge of the silk strip comprises a folded layer of an edge of the silk which is stitched in place, and wherein the second widthwise edge of the silk strip comprises a folded layer of an edge of the silk which is stitched in place; and wherein a first widthwise edge of the second silk strip comprises a folded layer of an edge of the silk which is stitched in place, and wherein a second widthwise edge of the second silk strip comprises a folded layer of an edge of the silk which is stitched in place;

wherein the silk strip is non-stretchable in the horizontal direction.

2. The seat having the head rest cover of claim 1 wherein a length of the elastic strip is approximately three times a length of the silk strip in the horizontal direction in a relaxed position.

3. The seat of claim 1 wherein the seat is a vehicle seat.

4. The seat of claim 3 wherein the seat is positioned in a vehicle.

5. The seat having the head rest cover of claim 1 further comprising a stitch in a ditch joining the silk strip, second silk strip, and elastic strip at the first widthwise edge of the silk strip and at the second widthwise edge of the silk strip.

6. The seat having the head rest cover of claim 5 further comprising stitching joining the lengthwise edges of the silk strip and second silk strip.

7. The seat having the head rest cover of claim 5 wherein the elastic strip is seated in a pocket defined by the silk strip and second silk strip at the first and second widthwise ends of the silk strip.

8. The seat having the head rest cover of claim 1 wherein the silk strip is one of a natural silk and an artificial silk.

9. The head rest cover of claim 1 wherein the silk strip has a different color or pattern from the second silk strip.

10. The seat having the head rest cover of claim 1 wherein the elastic strip first end is positioned in a pocket defined between a portion of the folded layer of the silk strip on the first widthwise edge, and a portion of the folded layer of the second silk strip on the second widthwise edge.

11. The seat in claim 1, wherein the elastic strip is also longer than the silk strip in the horizontal direction in a relaxed position.

12. The seat in claim 1, wherein the elastic strip is 2-5 times longer than the silk strip in the horizontal direction in a relaxed position.

13. The seat in claim 1, wherein the folded layers of the first and second widthwise edges of the silk strip are baste-stitched to form a first and second baste-stitched edges, and a top and bottom edges of the silk strip are straight-stitched to join the second silk strip.

14. The seat in claim 13, wherein the elastic strip is seated in a pocket defined by the silk strip and second silk strip at the first and second widthwise ends of the silk strip, and stitched in a ditch where the first and second baste-stitched edges are located, to join the elastic strip, the silk strip, and the second silk strip.

15. A seat, comprising:

a base;

a back; and a head rest connected to a top of the back in a vertical direction;

a head rest cover horizontally attached around an outer perimeter of the head rest, the head rest cover comprising:

a silk strip positioned covering a front of the head rest; and an elastic strip having a first end attached to a first widthwise edge of the silk strip, and having a second end attached to a second widthwise edge of the silk strip and thereby forming the head rest cover as a loop, the elastic strip positioned in a partially stretched position around sides and a rear of the head rest, the elastic strip applying a force to the head rest by being in the partially stretched position, the force being a sole attached means of the head rest cover to the head rest;

wherein, the elastic strip is significantly longer than the silk strip in a horizontal direction in the partially stretched position;

wherein, the elastic strip is a sole structure attaching the head rest cover to the head rest;

wherein, a width of the elastic strip equals a width of the silk strip;

wherein, the elastic strip covers and contacts an entirety of the sides and the rear of the head rest;

a second silk strip attached to a rear of the silk strip and attached to the elastic strip;

a cotton layer between the silk strip and the second silk strip;

wherein the first widthwise edge of the silk strip comprises a folded layer of an edge of the silk which is stitched in place, and wherein the second widthwise edge of the silk strip comprises a folded layer of an edge of the silk which is stitched in place; and wherein a first widthwise edge of the second silk strip comprises a folded layer of an edge of the silk which is stitched in place, and wherein a second widthwise edge of the second silk strip comprises a folded layer of an edge of the silk which is stitched in place;

wherein the silk strip is non-stretchable in the horizontal direction.

16. A seat, comprising:

a base;

a back; and a head rest connected to a top of the back in a vertical direction;

a head rest cover horizontally attached around an outer perimeter of the head rest, the head rest cover comprising:

a silk strip positioned covering a front of the head rest; and an elastic strip having a first end attached to a first widthwise edge of the silk strip, and having a second end attached to a second widthwise edge of the silk strip and thereby forming the head rest cover as a loop, the elastic strip positioned in a partially stretched position around sides and a rear of the head rest, the elastic strip applying a force to the head rest by being in the partially stretched position, the force being a sole attached means of the head rest cover to the head rest;

wherein, the elastic strip is significantly longer than the silk strip in a horizontal direction in the partially stretched position;

wherein, the elastic strip is a sole structure attaching the head rest cover to the head rest;

wherein, a width of the elastic strip equals a width of the silk strip;

wherein, the elastic strip covers and contacts an entirety of the sides and the rear, as well as a leftmost part and a rightmost part of the front, of the head rest;

a second silk strip attached to a rear of the silk strip and attached to the elastic strip;

a cotton layer between the silk strip and the second silk strip;

wherein the first widthwise edge of the silk strip comprises a folded layer of an edge of the silk which is stitched in place, and wherein the second widthwise edge of the silk strip comprises a folded layer of an edge of the silk which is stitched in place; and wherein a first widthwise edge of the second silk strip comprises a folded layer of an edge of the silk which is stitched in place, and wherein a second widthwise edge of the second silk strip comprises a folded layer of an edge of the silk which is stitched in place;

wherein the silk strip is non-stretchable in the horizontal direction.

* * * * *